(12) United States Patent
Kanazawa et al.

(10) Patent No.: US 12,066,735 B2
(45) Date of Patent: Aug. 20, 2024

(54) OPTICAL MODULATOR MODULE

(71) Applicant: Nippon Telegraph and Telephone Corporation, Tokyo (JP)

(72) Inventors: Shigeru Kanazawa, Tokyo (JP); Hiromasa Tanobe, Tokyo (JP); Josuke Ozaki, Tokyo (JP); Shinsuke Nakano, Tokyo (JP); Nobuhiro Kikuchi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 657 days.

(21) Appl. No.: 17/276,656

(22) PCT Filed: Sep. 11, 2019

(86) PCT No.: PCT/JP2019/035681
§ 371 (c)(1),
(2) Date: Mar. 16, 2021

(87) PCT Pub. No.: WO2020/066613
PCT Pub. Date: Apr. 2, 2020

(65) Prior Publication Data
US 2021/0341812 A1 Nov. 4, 2021

(30) Foreign Application Priority Data

Sep. 25, 2018 (JP) ................. 2018-178479

(51) Int. Cl.
*G02F 1/21* (2006.01)
*G02F 1/01* (2006.01)
*G02F 1/225* (2006.01)

(52) U.S. Cl.
CPC ............ *G02F 1/212* (2021.01); *G02F 1/0121* (2013.01); *G02F 1/2257* (2013.01)

(58) Field of Classification Search
CPC ...................................................... G02F 1/212
See application file for complete search history.

(56) References Cited

U.S. PATENT DOCUMENTS 5,359,449 A * 10/1994 Nishimoto ........... H04B 10/564
398/198
2005/0264862 A1* 12/2005 Arima .................. H01S 5/0265
359/237

(Continued)

FOREIGN PATENT DOCUMENTS

JP 2016539388 A1 12/2016
JP 2017173365 A 9/2017

OTHER PUBLICATIONS

K. Tsuzuki et al., "0.3 Vpp single-drive push-pull InP Mach-Zehnder modulator module for 43-Gbit/s systems," Optical Fiber Communication Conference, Anaheim, CA, Mar. 5-10, 2006, 3 pages.

(Continued)

*Primary Examiner* — Eric Wong
(74) *Attorney, Agent, or Firm* — Slater Matsil, LLP

(57) ABSTRACT

In a terminator, a midpoint electrode is provided between a first signal electrode and a second signal electrode, a first resistor is connected between the first signal electrode and the midpoint electrode, a second resistor is connected between the second signal electrode and the midpoint electrode, a first GND electrode is provided on a side opposite to the side where the first resistor is provided with the first signal electrode interposed therebetween, a second GND electrode is provided on the side opposite to the side where the second resistor is provided with the second signal electrode interposed therebetween, and capacitances in the terminator are formed between the first signal electrode and the midpoint electrode, between the second signal electrode and the midpoint electrode, between the first signal electrode (Continued)

and the first GND electrode, and between the second signal electrode and the second GND electrode.

20 Claims, 7 Drawing Sheets

(56) References Cited

U.S. PATENT DOCUMENTS

| | | | | |
|---|---|---|---|---|
| 2006/0171011 | A1* | 8/2006 | Nakajima | G02F 1/0356 |
| | | | | 359/239 |
| 2011/0069924 | A1* | 3/2011 | Murata | G02F 1/225 |
| | | | | 385/2 |
| 2013/0209021 | A1* | 8/2013 | Hayashi | G02F 1/225 |
| | | | | 385/2 |
| 2016/0349541 | A1 | 12/2016 | Velthaus et al. | |
| 2017/0227798 | A1* | 8/2017 | Ishikawa | G02F 1/035 |
| 2018/0180965 | A1* | 6/2018 | Goi | G02F 1/2255 |
| 2019/0129273 | A1* | 5/2019 | Tanaka | G02F 1/01708 |
| 2019/0163028 | A1* | 5/2019 | Miyazaki | H04B 10/5161 |

OTHER PUBLICATIONS

S. Nakano et al., "A 2.25-mW/GB/s 80-GB/s-PAM4 Linear Driver with a Single Supply using Stacked Current-Mode Architecture in 65-nm CMOS," 2017 Symposium on VLSA Circuits, Kyoto, Japan, Jun. 5-8, 2017, 2 pages.

* cited by examiner

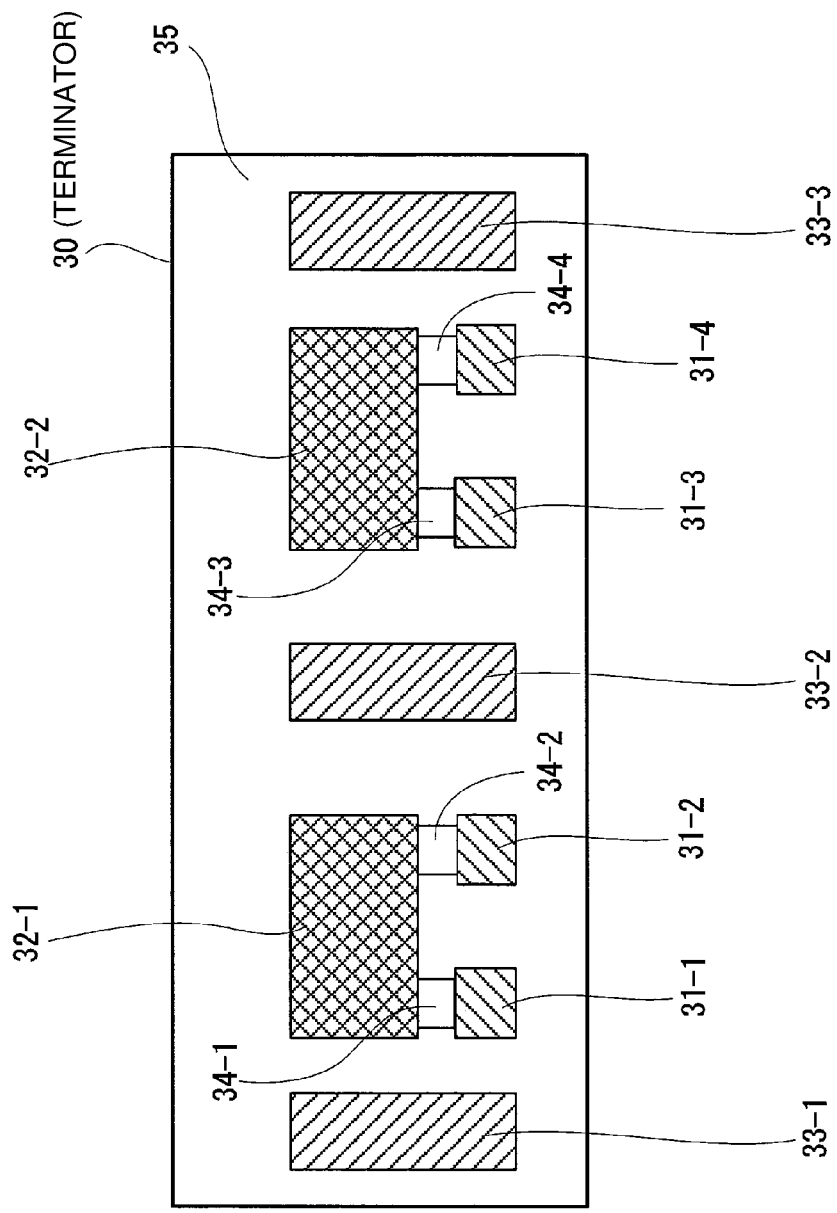

OPTICAL MODULATOR MODULE

CROSS-REFERENCE TO RELATED APPLICATIONS

This application is a national phase entry of PCT Application No. PCT/JP2019/035681, filed on Sep. 11, 2019, which claims priority to Japanese Application No. 2018-178479, filed on Sep. 25, 2018, which applications are hereby incorporated herein by reference.

TECHNICAL FIELD

The present invention relates to an optical modulator module that modulates an optical signal with an electrical signal, and more particularly to an optical modulator module in which reflection at a terminator is suppressed.

BACKGROUND

As an optical modulator on the transmitter side of an optical communication system for long distance transmission exceeding 100 km, the research and development of a semiconductor Mach-Zehnder modulator (hereinafter, also referred to as a "MZ modulator") is progressing. A driver integrated circuit (IC) for amplifying an electrical signal is also required to drive the MZ modulator.

In recent years, a structure in which this driver IC and a chip on which the MZ modulator is formed (MZ modulator chip) are integrated in a module has been studied from the viewpoint of size reduction, wide band, and low power consumption.

Inside the module in which the driver IC and the MZ modulator chip are integrated (optical modulator module), generally, a terminator including a resistor as a terminating resistor according to the characteristic impedance of the MZ modulator chip is provided on the outlet side of a traveling wave type electrode pair formed on the MZ modulator chip (for example, refer to Non-Patent Literature 1).

FIG. 8 shows a main part of a conventional optical modulator module 200. The optical modulator module 200 includes an MZ modulator chip 10, a driver IC 20, and a terminator 30.

In the MZ modulator chip 10, traveling wave type electrode pairs 11 and 12 used as electrical signal transmission lines, GND electrodes 13-1 to 13-3 provided so as to sandwich the transmission lines of the traveling wave type electrode pairs 11 and 12, and an optical waveguide 16 which is used as an optical signal waveguide are formed.

On the MZ modulator chip 10, the optical waveguide 16 is branched into two optical waveguides 14 and 15, the optical waveguide 14 is divided into two paths 14-1 and 14-2 between electrodes 11-1 and 11-2 of the traveling wave type electrode pair 11, and the optical waveguide 15 is divided into two paths 15-1 and 15-2 between electrodes 12-1 and 12-2 of the traveling wave type electrode pair 12.

The driver IC 20 includes differential amplifiers 21 and 22, the differential amplifier 21 is electrically connected to one end portion (an end portion on the inlet side) of the traveling wave type electrode pair 11 in the MZ modulator chip 10, and the differential amplifier 22 is electrically connected to one end portion (an end portion on the inlet side) of the traveling wave type electrode pair 12 in the MZ modulator chip 10.

As shown in the enlarged view of FIG. 9, the terminator 30 includes signal electrodes 31-1 to 31-4, midpoint electrodes 32-1 and 32-2, and GND electrodes 33-1 to 33-3, and resistors (thin film resistors) 34-1 to 34-4 provided on a substrate 35.

In this terminator 30, the signal electrodes 31-1 and 31-2 are electrically connected to the other end portions (the end portions on the outlet side) of the electrodes 11-1 and 11-2 of the traveling wave type electrode pair 11 in the MZ modulator chip 10 by wires, and the signal electrodes 31-3 and 31-4 are electrically connected to the other end portions (the end portions on the outlet side) of the electrodes 12-1 and 12-2 of the traveling wave type electrode pair 12 in the MZ modulator chip 10 by wires.

In addition, in the terminator 30, the midpoint electrode 32-1 is provided between the GND electrodes 33-1 and 33-2, and the midpoint electrode 32-2 is provided between the GND electrodes 33-2 and 33-3. Further, the signal electrodes 31-1 and 31-2 are provided below the midpoint electrode 32-1, and the signal electrodes 31-3 and 31-4 are provided below the midpoint electrode 32-2.

In addition, the resistors 34-1 to 34-4 have the same resistance value, the resistor 34-1 is connected between the signal electrode 31-1 and the midpoint electrode 32-1, the resistor 34-2 is connected between the signal electrode 31-2 and the midpoint electrode 32-1, the resistor 34-3 is connected between the signal electrode 31-3 and the midpoint electrode 32-2, and the resistor 34-4 is connected between the signal electrode 31-4 and the midpoint electrode 32-2.

CITATION LIST

Non-Patent Literature

Non-Patent Literature 1: K. Tsuzuki et. al., "0.3 Vpp single-drive push-pull InP Mach-Zehnder modulator module for 43-Gbit/s systems," in Proc. OFC2006 OWC2.

Non-Patent Literature 2: S. Nakano et. al., "A 2.25-mW/Gb/s 80-Gb/s-PAM4 Linear Driver with a Single Supply using Stacked Current-Mode Architecture in 65-nm CMOS," in Proc. VLSI symposium 2017 C25-3.

SUMMARY

Technical Problem

In the optical modulator module 200, since the terminator 30 and the MZ modulator chip 10 can be matched in a low frequency region of 10 GHz or less, the reflection characteristic can be sufficiently reduced. However, in a region of more than 10 GHz, since the capacitance and inductance of the MZ modulator chip 10 is strong, there is a problem that the matching with the terminator 30 cannot be achieved and the reflection characteristics are deteriorated.

Further, in recent years, a module in which a driver IC called an open collector type is integrated to reduce power consumption has been studied (for example, refer to Non-Patent Literature 2). However, since the open collector type driver IC undergoes total reflection when a signal reflected at the terminator is incident, there the driver IC is particularly sensitive to deterioration of reflection characteristics and there is a problem that ripples occur in frequency response characteristics.

Embodiments of the present invention have been made to solve such problems, and an object of the present invention is to provide an optical modulator module capable of improving reflection characteristics even in a high frequency region of 10 GHz or more.

Means for Solving the Problem

In order to achieve such an object, embodiments of the present invention provide an optical modulator module (100) for modulating an optical signal with an electrical signal including: a Mach-Zehnder modulator chip (10) including an electrode pair (11) serving as an electrical signal transmission line and an optical waveguide (14) serving as an optical signal waveguide; a driver IC (20) electrically connected to one end portion of the electrode pair; and a terminator (40) electrically connected to the other end portion of the electrode pair, in which the terminator includes a substrate (45), a first signal electrode (41-1) which is connected to one electrode (11-1) of the electrode pair and is provided on the substrate, a second signal electrode (41-2) which is provided on the substrate and connected to the other electrode (11-2) of the electrode pair, a midpoint electrode (42-1) which is provided between the first signal electrode and the second signal electrode on the substrate, a first resistor (44-1) which is provided on the substrate and connected between the first signal electrode and the midpoint electrode, a second resistor (44-2) which is provided on the substrate and connected between the second signal electrode and the midpoint electrode, a first GND electrode (43-1) which is provided on the substrate on a side opposite to the side on which the first resistor is provided with the first signal electrode interposed therebetween, and a second GND electrode (43-2) which is provided on the substrate on a side opposite to the side on which the second resistor is provided with the second signal electrode interposed therebetween.

According to embodiments of the present invention, since capacitances are formed between the first signal electrode and the midpoint electrode, between the second signal electrode and the midpoint electrode, between the first signal electrode and the first GND electrode, and between the second signal electrode and the second GND electrode, it is possible to increase the number of capacitance components in the terminator and suppress reflection at the terminator.

In the above description, as an example, the constituent elements in the drawings corresponding to the constituent elements of embodiments of the present invention are indicated by reference numerals in parentheses.

Effects of Embodiments of the Invention

As described above, according to embodiments of the present invention, the reflection characteristics can be improved even in a high frequency region of 10 GHz or higher by increasing the number of capacitance components in the terminator.

BRIEF DESCRIPTION OF THE DRAWINGS

FIG. 9 is an enlarged view of a terminator in a conventional optical modulator module.

DETAILED DESCRIPTION OF ILLUSTRATIVE EMBODIMENTS

Hereinafter, embodiments of the present invention will be described in detail with reference to the drawings.

Figure 1:
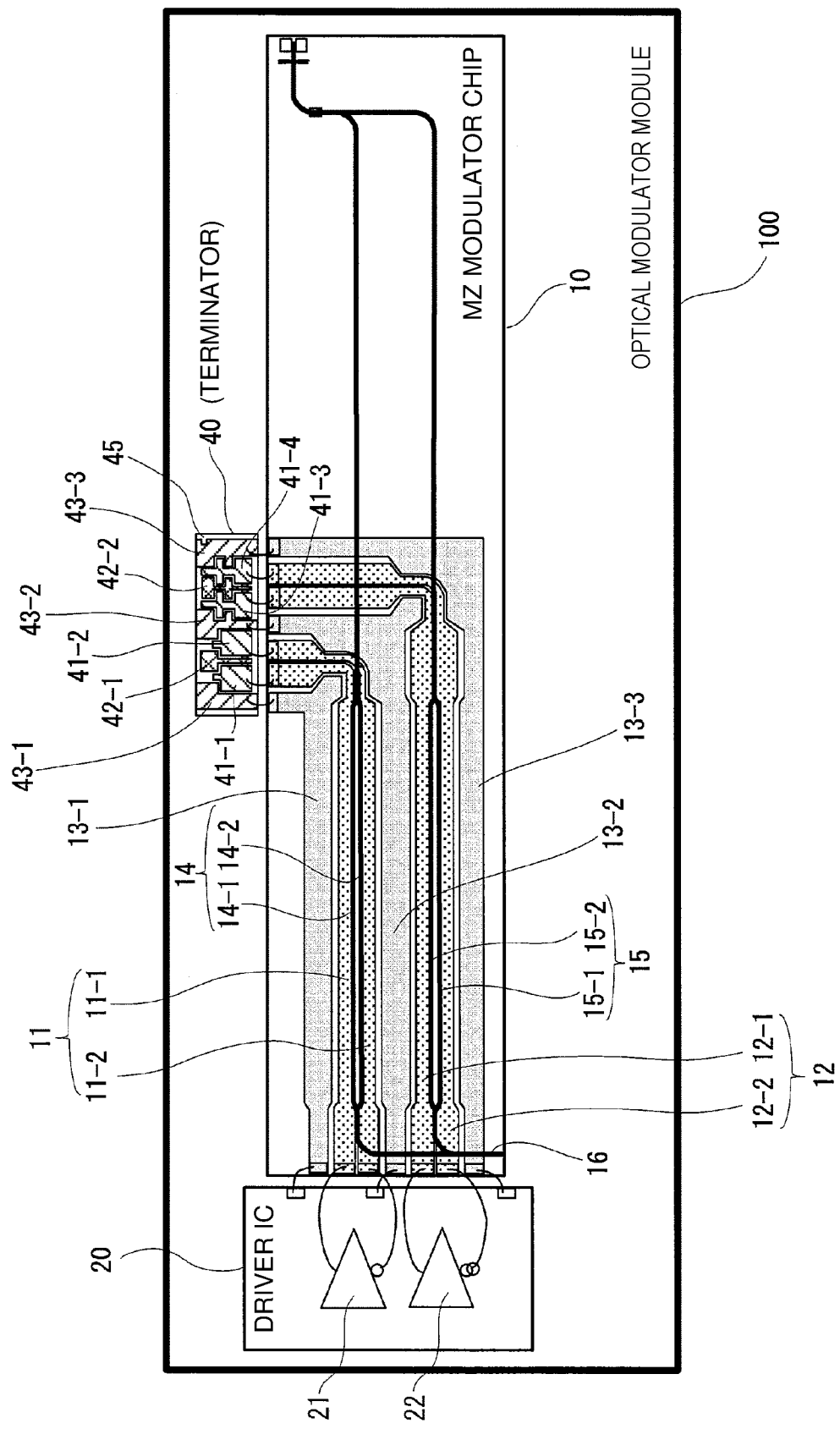
FIG. 1 is a diagram showing a main part of an optical modulator module according to an embodiment of the present invention.

FIG. 1 shows a main part of an optical modulator module 100 according to an embodiment of the present invention. In the drawing, the same components as those described with reference to FIG. 8 are designated by the same reference numerals, and the description thereof will be omitted.

Figure 8:
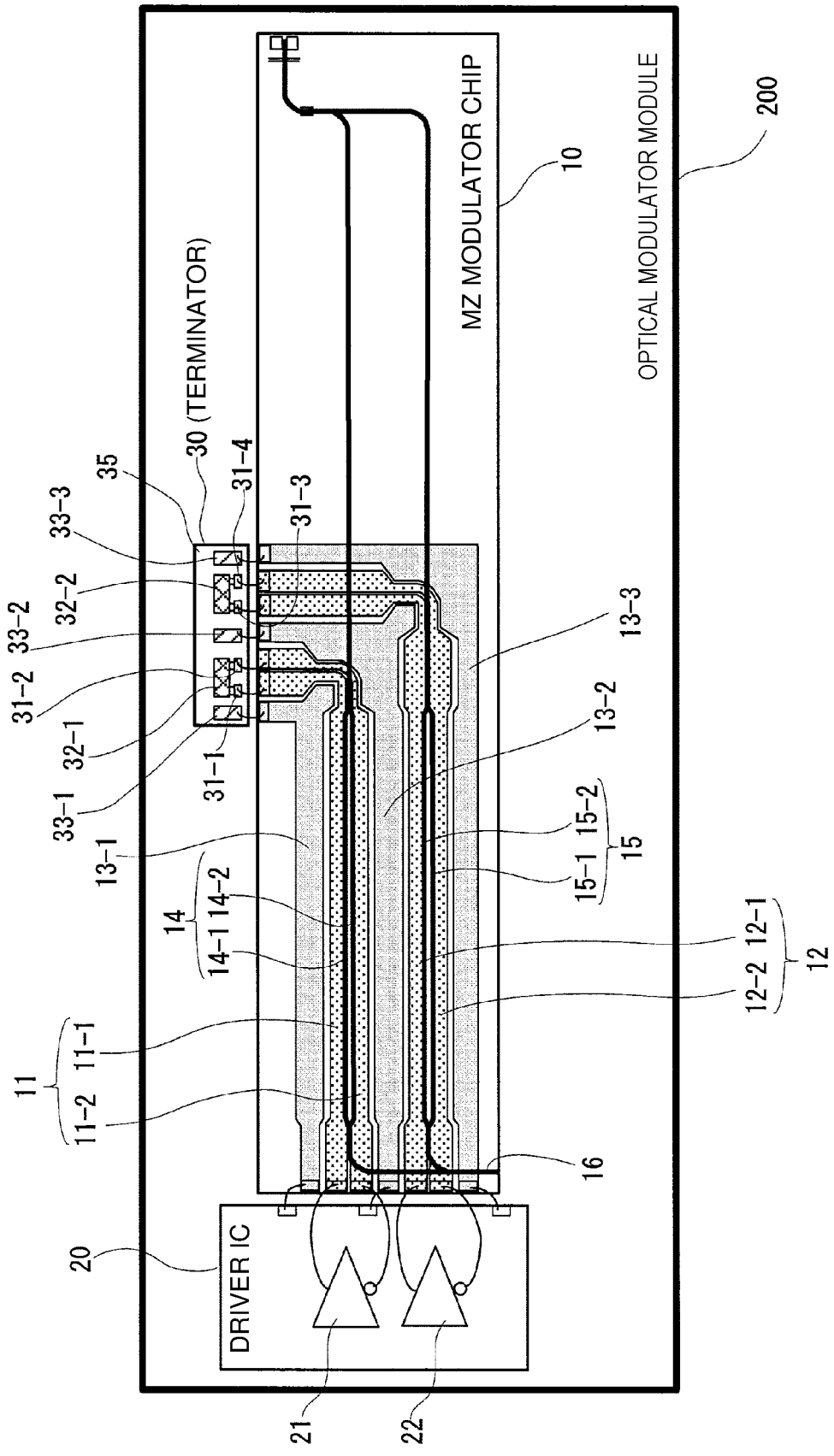
FIG. 8 is a diagram showing a main part of a conventional optical modulator module.

In the optical modulator module 100, instead of a terminator 30 in a conventional optical modulator module 200 shown in FIG. 8, a terminator 40 having an electrode pattern designed to have an optimum capacitance and inductor is provided so that the characteristics match even in a high frequency region of 10 GHz or higher.

Figure 2:
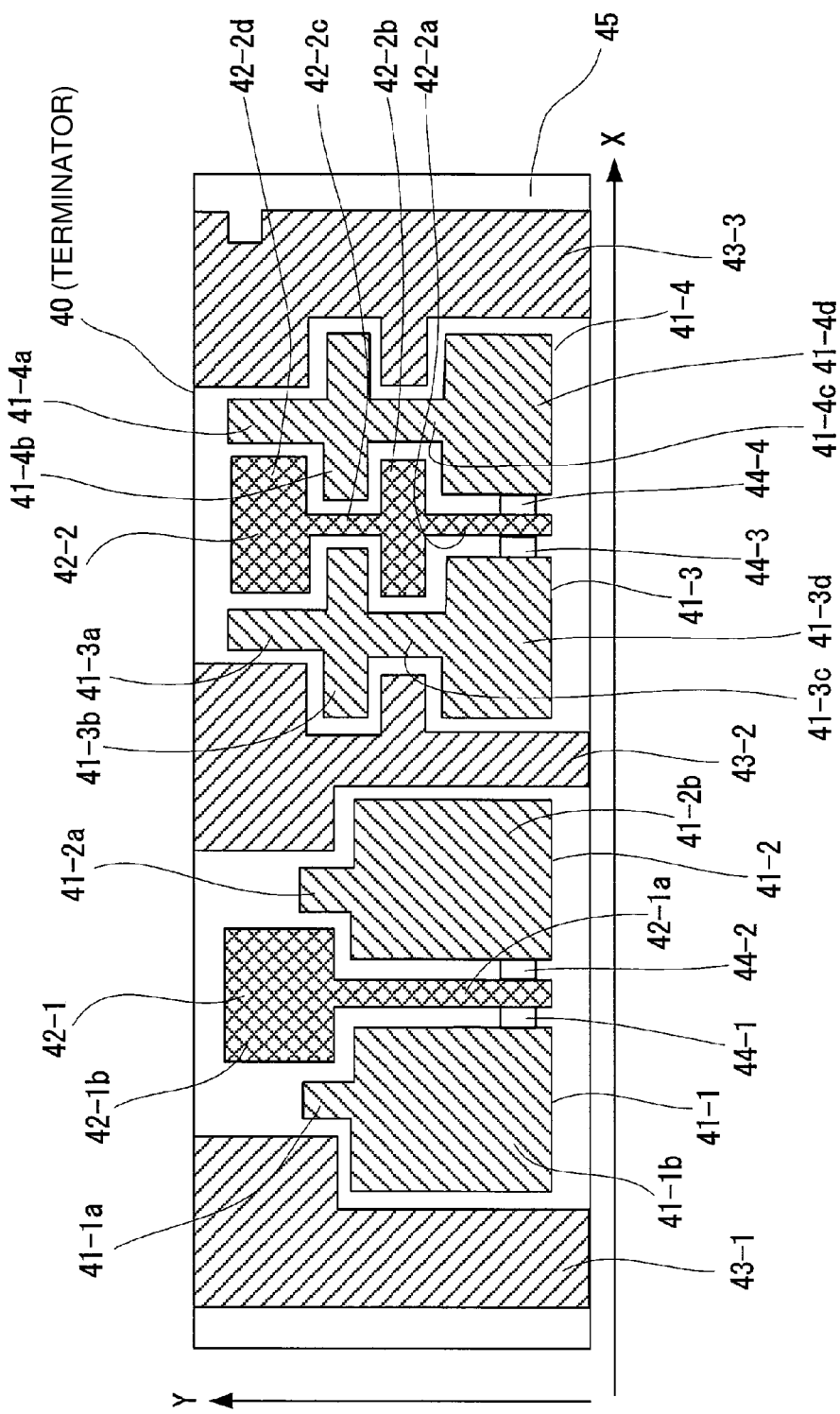
FIG. 2 is an enlarged view of a terminator in the optical modulator module according to an embodiment of the present invention.

As shown in the enlarged view of FIG. 2, the terminator 40 includes signal electrodes 41-1 to 41-4, midpoint electrodes 42-1 and 42-2, and GND electrodes 43-1 to 43-3, and resistors (thin film resistors) 44-1 to 44-4 provided on a substrate 45.

In FIG. 2, an X direction (an arrangement direction of each electrode) is a width direction of each electrode, and a Y direction (a direction orthogonal to the arrangement direction of each electrode) is a length direction of each electrode. In addition, the signal electrodes 41-1 to 41-4, the midpoint electrodes 42-1 and 42-2, and the GND electrodes 43-1 to 43-3 are made of gold, aluminum, or the like, and the resistors 44-1 to 44-4 are made of tantalum nitride, chromium, or the like.

In this terminator 40, the signal electrodes 41-1 and 41-2 are electrically connected to end portions on the outlet side of the electrodes 11-1 and 11-2 of the traveling wave type electrode pair 11 in the MZ modulator chip 10 by wires, and the signal electrodes 41-3 and 41-4 are electrically connected to the end portions on the outlet side of the electrodes 12-1 and 12-2 of the traveling wave type electrode pair 12 in the MZ modulator chip 10 by wires.

Further, in the terminator 40, the midpoint electrode 42-1 is formed of a combination of a lower side midpoint electrode portion 42-1a and an upper side midpoint electrode portion 42-1b which have a rectangular shape and are connected in the Y direction, and the width of the lower side midpoint electrode portion 42-1a is narrower than the width of the upper side midpoint electrode portion 42-1b.

In addition, the signal electrode 41-1 is formed of a combination of an upper side signal electrode portion 41-1a and a lower side signal electrode portion 41-1b which have a rectangular shape and are connected in the Y direction, and the width of the upper side signal electrode portion 41-1a is narrower than the width of the lower side signal electrode portion 41-1b.

Similarly to the signal electrode 41-1, the signal electrode 41-2 is also formed of a combination of an upper side signal electrode portion 41-2a and a lower side signal electrode portion 41-2b which have a rectangular shape and are connected in the Y direction, and the width of the upper side signal electrode portion 41-2a is narrower than the width of the lower side signal electrode portion 41-2b.

The midpoint electrode 42-1 is provided between the signal electrode 41-1 and the signal electrode 41-2 so as to satisfy the requirements described below. A first requirement is that the lower side midpoint electrode portion 42-1a (narrow midpoint electrode portion) is positioned between the lower side signal electrode portion 41-1b (wide signal electrode portion) of the signal electrode 41-1 and the lower side signal electrode portion 41-2b (wide signal electrode portion) of the signal electrode 41-2. A second requirement is that the upper side midpoint electrode portion 42-1b (wide midpoint electrode portion) is positioned between the upper side signal electrode portion 41-1a (narrow signal electrode portion) of the signal electrode 41-1 and the upper side signal electrode portion 41-2a (narrow signal electrode portion) of the signal electrode 41-2.

Further, in the terminator 40, the midpoint electrode 42-2 is formed of a combination of a first set of a lower side midpoint electrode portion 42-2a and an upper side midpoint electrode portion 42-2b which have a rectangular shape and are connected in the Y direction, and a combination of a second set of a lower side midpoint electrode portion 42-2c and an upper side midpoint electrode portion 42-2d which have a rectangular shape and are connected in the Y direction similarly. The width of the lower side midpoint electrode portion 42-2a of the first set is equal to the width of the lower side midpoint electrode portion 42-2c of the second set. The width of the upper side midpoint electrode portion 42-2b of the first set is equal to the width of the upper side midpoint electrode portion 42-2d of the second set. The width of the lower side midpoint electrode portions 42-2a and 42-2c is narrower than the width of the upper side midpoint electrode portions 42-2b and 42-2d.

In addition, the signal electrode 41-3 is formed of a combination of a first set of an upper side signal electrode portion 41-3a and a lower side signal electrode portion 41-3b, which have a rectangular shape and are connected in the Y direction, and a combination of a second set of an upper side signal electrode portion 41-3c and a lower side signal electrode portion 41-3d which have a rectangular shape and are connected in the Y direction similarly. The width of the upper side signal electrode portion 41-3a of the first set is equal to the width of the upper side signal electrode portion 41-3c of the second set. The width of the lower side signal electrode portion 41-3b, of the first set is equal to the width of the lower side signal electrode portion 41-3d of the second set. The width of the upper side signal electrode portions 41-3a and 41-3c is narrower than the width of the lower side signal electrode portions 41-3b, and 41-3d.

Similarly to the signal electrode 41-3, the signal electrode 41-4 is formed of a combination of a first set of an upper side signal electrode portion 41-4a and a lower side signal electrode portion 41-4b which have a rectangular shape and are connected in the Y direction, and a combination of a second set of an upper side signal electrode portion 41-4c and a lower side signal electrode portion 41-4d which have a rectangular shape and are connected in the Y direction similarly. The width of the upper side signal electrode portion 41-4a of the first set is equal to the width of the upper side signal electrode portion 41-4c of the second set. The width of the lower side signal electrode portion 41-4b of the first set is equal to the width of the lower side signal electrode portion 41-4d of the second set. The width of the upper side signal electrode portions 41-4a and 41-4c is narrower than the width of the lower side signal electrode portions 41-4b and 41-4d.

The midpoint electrode 42-2 is provided between the signal electrode 41-3 and the signal electrode 41-4 so as to satisfy the requirements described below. A first requirement is that the lower side midpoint electrode portion 42-2a (narrow midpoint electrode portion) of the first set is positioned between the lower side signal electrode portion 41-3d (wide signal electrode portion) of the second set of the signal electrode 41-3 and the lower side signal electrode portion 41-4d (wide signal electrode portion) of the second set of the signal electrode 41-4. A second requirement is that the upper side midpoint electrode portion 42-2b (wide midpoint electrode portion) of the first set is positioned between the upper side signal electrode portion 41-3c (narrow signal electrode portion) of the second set of the signal electrode 41-3 and the upper side signal electrode portion 41-4c (narrow signal electrode portion) of the second set of the signal electrode 41-4. A third requirement is that the lower side midpoint electrode portion 42-2c (narrow midpoint electrode portion) of the second set is positioned between the lower side signal electrode portion 41-3b (wide signal electrode portion) of the first set of the signal electrode 41-3 and the lower side signal electrode portion 41-4b (wide signal electrode portion) of the first set of the signal electrode 41-4. A fourth requirement is that the upper side midpoint electrode portion 42-2d (wide midpoint electrode portion) of the second set is positioned between the upper side signal electrode portion 41-3a (narrow signal electrode portion) of the first set of the signal electrode 41-3 and the upper side signal electrode portion 41-4a (narrow signal electrode portion) of the first set of the signal electrode 41-4.

In addition, in the terminator 40, the resistors 44-1 to 44-4 have the same resistance value. Here, each of the resistors is connected to the electrode as described below. The resistor 44-1 is connected between the lower side signal electrode portion 41-1b of the signal electrode 41-1 and the lower side midpoint electrode portion 42-1a of the midpoint electrode 42-1. The resistor 44-2 is connected between the lower side signal electrode portion 41-2b of the signal electrode 41-2 and the lower side midpoint electrode portion 42-1a of the midpoint electrode 42-1. The resistor 44-3 is connected between the lower side signal electrode portion 41-3d of the second set of the signal electrode 41-3 and the lower side midpoint electrode portion 42-2a of the first set of the midpoint electrode 42-2. The resistor 44-4 is connected between the lower side signal electrode portion 41-4d of the second set of the signal electrode 41-4 and the lower side midpoint electrode portion 42-2a of the first set of the midpoint electrode 42-2.

In addition, the GND electrode 43-1 is provided on a side opposite to the side on which the resistor 44-1 is provided with the signal electrode 41-1 interposed therebetween. The GND electrode 43-2 is provided between the signal electrode 41-2 and the signal electrode 41-3 (a side opposite to the side on which the resistors 44-2 and 44-3 are respectively provided with the signal electrodes 41-2 and 41-3 interposed therebetween). The GND electrode 43-3 is provided on a side opposite to the side on which the resistor 44-4 is provided with the signal electrode 41-4 interposed therebetween.

In the optical modulator module 100, the driver IC 20 is an open collector type driver IC and a difference in height of the upper surfaces of the MZ modulator chip 10, the driver IC 20 and the terminator 40 is within ±0.1 mm. This is because since the maximum distance between the wire start point connected to the signal electrodes 41-1 to 41-4 on the terminator 40 and the wire end point connected to the electrode pairs 11 and 12 on the MZ modulator chip 10 may be about 280 μm due to the mounting performance of a mounting machine, the height has to be within ±0.1 mm in order to set the wire length to 300 μm or less.

In the optical modulator module 100, capacitances are formed between the signal electrode 41-1 and the midpoint electrode 42-1, between the signal electrode 41-2 and the midpoint electrode 42-1, between the signal electrode 41-1 and the GND electrode 43-1, and between the signal electrode 41-2 and the GND electrode 43-2. In addition, capacitances are formed between the signal electrode 41-3 and the midpoint electrode 42-2, between the signal electrode 41-4 and the midpoint electrode 42-2, between the signal electrode 41-3 and the GND electrode 43-2, and between the signal electrode 41-4 and the GND electrode 43-3. Accordingly, the number of capacitance components in the terminator 40 is increased and thus reflection at the terminator 40 can be suppressed.

In addition, in the optical modulator module 100, the signal electrodes 41-1 and 41-2 are formed of one combination of a narrow signal electrode portion (41-1a, 41-2a) and a wide signal electrode portion (41-1b, 41-2b). In the optical modulator module 100, the signal electrodes 41-3 and 41-4 are formed of two combinations of a narrow signal electrode portion (41-3a, 41-4a, 41-3c, 41-4c) and a wide signal electrode portion (41-3b, 41-4b, 41-3d, 41-4d). With such a structure, the capacity can be efficiently increased in a small terminator. That is, as the number of combinations of a narrow signal electrode portion and a wide signal electrode portion increases, the outer circumference of the signal electrode becomes longer. Thus, the number of capacitance components in the terminator is further increased.

In the optical modulator module 100 according to the embodiment, the signal electrodes 41-1 and 41-2 to be connected to the traveling wave type electrode pair 11 (the electrode pair whose transmission line is short) in the MZ modulator chip 10 are formed of one combination of a narrow signal electrode portion and a wide signal electrode portion. In the optical modulator module 100 according to the embodiment, the signal electrodes 41-3 and 41-4 to be connected to the traveling wave type electrode pair 12 (the electrode pair whose transmission line is long) in the MZ modulator chip 10 are formed of two combinations of a narrow signal electrode portion and a wide signal electrode portion. In this manner, as length of the transmission line of the traveling wave type electrode pair in the modulator chip 10 becomes longer, the number of combinations of a narrow signal electrode portion and a wide signal electrode portion in the signal electrodes to be connected to the traveling wave type electrode pair is increased. Thus, reflection can be suppressed even in a high frequency region of 10 GHz or more.

Figure 3:
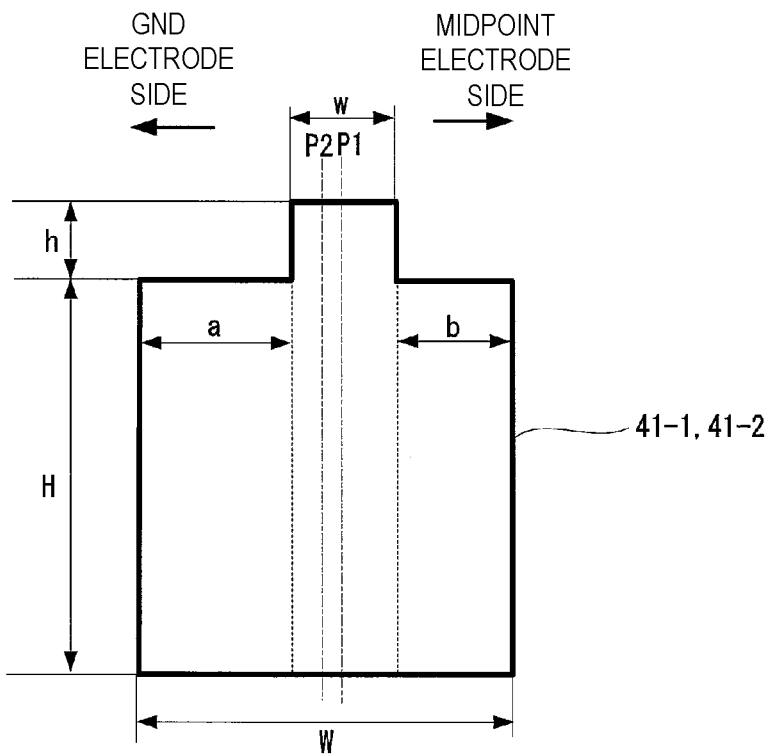
FIG. 3 is a diagram exemplifying parameters of a signal electrode having one combination of a narrow electrode portion and a wide electrode portion in the terminator.

In the embodiment, as shown in FIG. 3, when the parameters of the signal electrodes 41-1 and 41-2 in the terminator 40 are defined as a, b, w, W, H, and h, a=90 μm, b=80 μm, w=50 μm, W=220 μm, H=250 μm, and h=80 μm.

Figure 4:
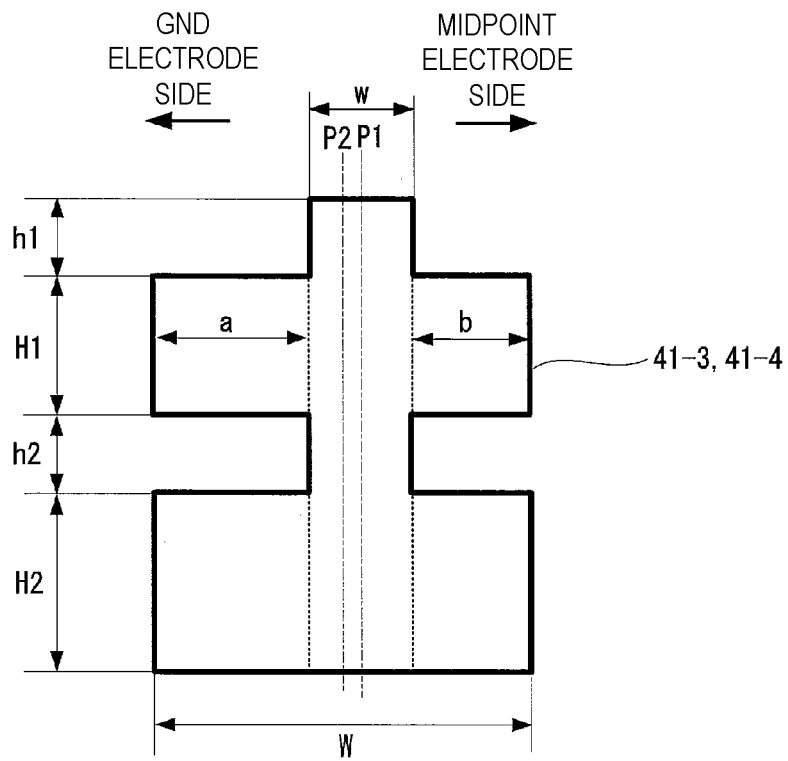
FIG. 4 is a diagram exemplifying parameters of a signal electrode having two combinations of a narrow electrode portion and a wide electrode portion in the terminator.

In addition, as shown in FIG. 4, when the parameters of the signal electrodes 41-3 and 41-4 in the terminator 40 are defined as a, b, w, W, H1, h1, H2, and h2, a=90 μm, b=80 μm, w=50 μm, W=220 μm, H2=50 μm, h1=140 μm, H2=140 μm, and h2=110 μm.

By setting a>b, that is, by setting a center position P1 of the narrow signal electrode portion in the width direction to be closer to the midpoint electrode side than a center position P2 of the wide signal electrode portion in the width direction, the effective capacitance can be increased without changing the size of the terminator (without increasing the size of the terminator). In addition, since the effective capacitance can be increased, the size reduction of the terminator can be achieved.

Figure 5:
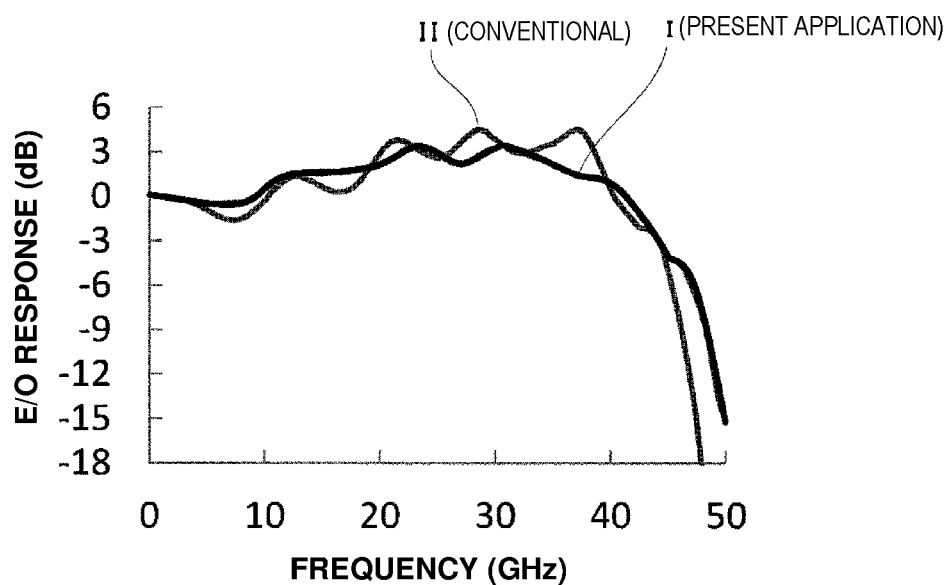
FIG. 5 is a diagram showing a result of estimating E/O response characteristics (module characteristics) by simulation.

In FIG. 5, for the optical modulator module 100 (present application) according to the embodiment and the conventional optical modulator module 200 (conventional) shown in FIG. 8, the results of estimating the E/O response characteristics (module characteristics) by simulation are shown. In the drawing, I represents the module characteristics of the present embodiment, and II represents the conventional module characteristics. As can be seen from the drawing, it is found that compared to the conventional module characteristics II, the module characteristics I of the present embodiment show that the ripple in the E/O response is suppressed as a result of the suppression of the reflection at the termination resistance.

From the result, it is shown that the optical modulator module 100 using the terminator 40 according to the embodiment is effective in suppressing the ripple in the E/O response characteristics since the reflection characteristics can be sufficiently suppressed.

Figure 6:
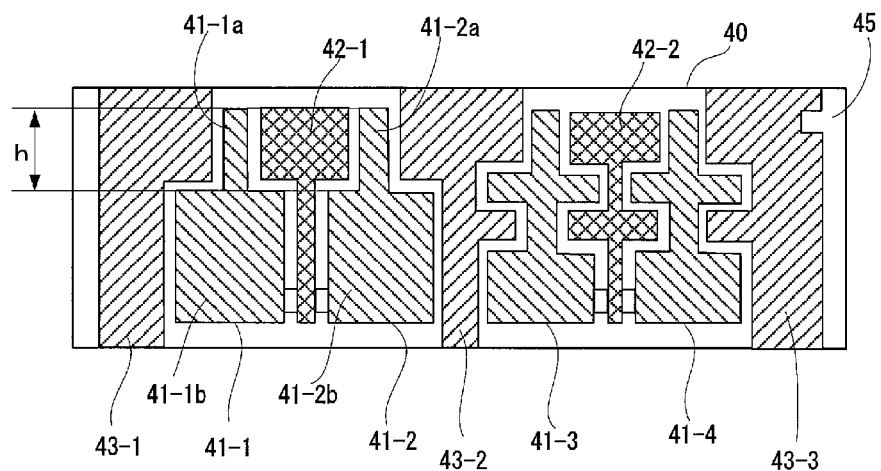
FIG. 6 is a diagram showing a state before adjustment of the shape of the signal electrode in the terminator.

In addition, in the above-described embodiment, the signal electrodes 41-1 to 41-4 are structured so that the shape of the electrodes can be adjusted. For example, in a case where the length of the upper side signal electrode portions 41-1a and 41-2a of the signal electrodes 41-1 and 41-2 before adjustment is h=100 μm (refer to FIG. 6), by trimming the length of the upper side signal electrode portions 41-1a and 41-2a of the signal electrodes 41-1 and 41-2 based on the measurement results of the reflection characteristics of the MZ modulator chip 10 (refer to FIG. 7), the length of the upper side signal electrode portions 41-1a and 41-2a can be adjusted to, for example, h=50 μm.

Figure 7:
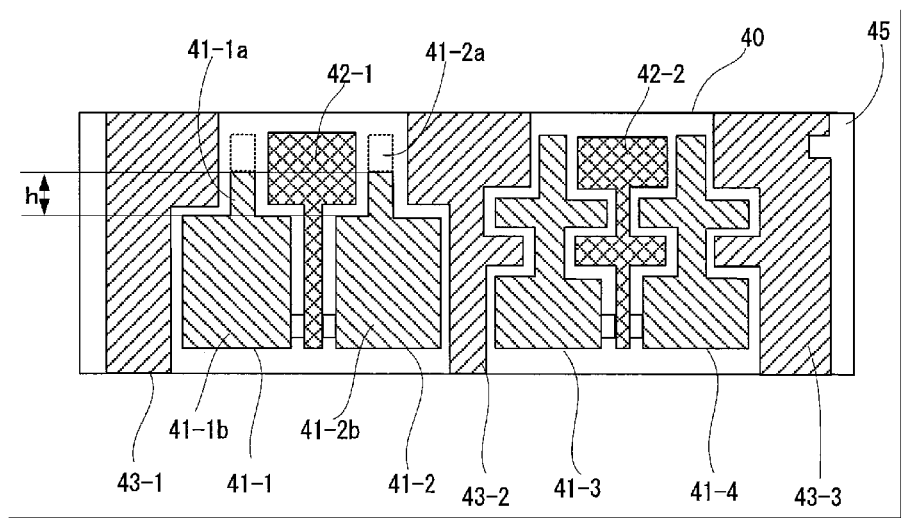
FIG. 7 is a diagram showing a state after adjustment of the shape of the signal electrode in the terminator.

The reflection characteristics were measured before adjusting the shape of the signal electrode (FIG. 6) and after adjusting the shape of the signal electrode (FIG. 7). As a result, in the frequency region up to 30 GHz, the optical modulator module 100 using the terminator 40 before adjustment had a maximum reflection response value of −10 dB. In contrast, in the optical modulator module 100 using the terminator 40 after adjustment, the maximum value was −11.5 dB. From the result, it was shown that the adjustment of the shape of the signal electrode was effective in improving the reflection characteristics.

Expansion of Embodiments

Although the present invention has been described above with reference to the embodiments, the present invention is not limited to the above embodiments. Various modifications that can be understood by those skilled in the art can be made to the configurations and the details of the present invention without departing from the scope of the present invention.

REFERENCE SIGNS LIST

10 MZ modulator chip
11, 12 Traveling wave type electrode pair
11-1, 11-2, 12-1, 12-2 Electrode
13-1 to 13-3 GND electrode
14, 15, 16 Optical waveguide
20 Driver IC
40 Terminator 41-1 to 41-4 Signal electrode
41-1a, 41-2a, 41-3a, 41-4a, 41-3c, 41-4c Upper side signal electrode portion (narrow signal electrode portion)
41-1b, 41-2b, 41-3b, 41-4b, 41-3d, 41-4d Lower side signal electrode (wide signal electrode portion)
42-1, 42-2 Midpoint electrode
43-1 to 43-3 GND electrode
44-1 to 44-4 Resistor
45 Substrate
100 Optical modulator module

The invention claimed is:

1. An optical modulator module for modulating an optical signal with an electrical signal, the optical modulator module comprising:
a Mach-Zehnder modulator chip including an electrode pair as an electrical signal transmission line and an optical waveguide as an optical signal waveguide, wherein the optical waveguide is disposed between and extends parallel to a first electrode of the electrode pair and a second electrode of the electrode pair;
a driver IC electrically connected to a first end portion of the electrode pair; and
a terminator in a separate chip than the Mach-Zehnder modulator chip and electrically connected to a second end portion of the electrode pair, the second end portion being a terminating end portion of the electrode pair, wherein the terminator comprises:
a substrate;
a first signal electrode on the substrate and connected to the second end portion of the first electrode of the electrode pair;
a second signal electrode on the substrate and connected to the second end portion of the second electrode of the electrode pair;
a midpoint electrode on the substrate between the first signal electrode and the second signal electrode;
a first resistor on the substrate and connected between the first signal electrode and the midpoint electrode;
a second resistor on the substrate and connected between the second signal electrode and the midpoint electrode;
a first GND electrode on the substrate on a side opposite the first resistor with the first signal electrode interposed therebetween; and
a second GND electrode on the substrate on a side opposite the second resistor with the second signal electrode interposed therebetween.

2. The optical modulator module according to claim 1, wherein when an arrangement direction of the first signal electrode, the second signal electrode, and the midpoint electrode is a width direction, the first signal electrode and the second signal electrode include a combination of a first electrode portion and a second electrode portion connected in a direction orthogonal to the width direction, and a width of the first electrode portion is narrower than a width of the second electrode portion.

3. The optical modulator module according to claim 2, wherein:
the Mach-Zehnder modulator chip includes a plurality of the electrode pairs having different lengths;
the terminator includes the first signal electrode and the second signal electrode provided for each electrode pair; and
in the first signal electrode and the second signal electrode provided for each electrode pair, as a length of the electrode pair connected to the first signal electrode and the second signal electrode becomes longer, a number of combinations of the first electrode portion and the second electrode portion increases.

4. The optical modulator module according to claim 2, wherein a center position of the first electrode portion in the width direction is closer to the midpoint electrode than a center position of the second electrode portion in the width direction.

5. The optical modulator module according to claim 4, wherein:
the Mach-Zehnder modulator chip includes a plurality of the electrode pairs having different lengths;
the terminator includes the first signal electrode and the second signal electrode provided for each electrode pair; and
in the first signal electrode and the second signal electrode provided for each electrode pair, as a length of the electrode pair connected to the first signal electrode and the second signal electrode becomes longer, a number of combinations of the first electrode portion and the second electrode portion increases.

6. The optical modulator module according to claim 5, wherein the first signal electrode and the second signal electrode are structured such that a shape of each electrode is adjustable.

7. The optical modulator module according to claim 1, wherein the first signal electrode and the second signal electrode are structured such that a shape of each electrode is adjustable.

8. A terminator for inclusion in an optical modulator module for modulating an optical signal with an electrical signal, the terminator comprising:
a substrate;
a first signal electrode on the substrate and configured to be connected to a first electrode of an electrode pair of a Mach-Zehnder modulator chip, wherein the terminator is in a separate chip than the Mach-Zehnder modulator chip;
a second signal electrode on the substrate and configured to be connected to a second electrode of the electrode pair of the Mach-Zehnder modulator chip;
a midpoint electrode on the substrate between and separate from the first signal electrode and the second signal electrode, wherein the midpoint electrode is separated from the first signal electrode by a first gap and from the second signal electrode by a second gap;
a first resistor on the substrate and connected between the first signal electrode and the midpoint electrode;
a second resistor on the substrate and connected between the second signal electrode and the midpoint electrode;
a first GND electrode on the substrate on a side opposite the first resistor with the first signal electrode interposed therebetween; and
a second GND electrode on the substrate on a side opposite the second resistor with the second signal electrode interposed therebetween.

9. The terminator according to claim 8, wherein when an arrangement direction of the first signal electrode, the second signal electrode, and the midpoint electrode is a width direction, the first signal electrode and the second signal electrode include a combination of a first electrode portion and a second electrode portion connected in a direction orthogonal to the width direction, and a width of the first electrode portion is narrower than a width of the second electrode portion.

10. The terminator according to claim 9, wherein a center position of the first electrode portion in the width direction is closer to the midpoint electrode than a center position of the second electrode portion in the width direction.

11. The terminator according to claim 8, wherein the first signal electrode and the second signal electrode are structured such that a shape of each electrode of the Mach-Zehnder modulator chip is configured to be adjustable.

12. A method for providing an optical modulator module for modulating an optical signal with an electrical signal, the method comprising:
provided a Mach-Zehnder modulator chip including an electrode pair serving as an electrical signal transmission line and an optical waveguide serving as an optical signal waveguide, wherein the optical waveguide is disposed between and extends parallel to a first electrode of the electrode pair and a second electrode of the electrode pair;
electrically connecting a driver IC to a first end portion of the electrode pair; and
providing a terminator electrically connected to a second end portion of the electrode pair, wherein the second end portion is a terminating end portion of the electrode pair, wherein the terminator is in a separate chip than the Mach-Zehnder modulator chip, and wherein providing the terminator comprises:
providing a substrate;
providing a first signal electrode on the substrate and connected to the second end portion of the first electrode of the electrode pair;
providing a second signal electrode on the substrate and connected to the second end portion of the second electrode of the electrode pair;
providing a midpoint electrode on the substrate between the first signal electrode and the second signal electrode;
providing a first resistor on the substrate and connected between the first signal electrode and the midpoint electrode;
providing a second resistor on the substrate and connected between the second signal electrode and the midpoint electrode;
providing a first GND electrode on the substrate on a side opposite the first resistor with the first signal electrode interposed therebetween; and
providing a second GND electrode on the substrate on a side opposite the second resistor with the second signal electrode interposed therebetween.

13. The method according to claim 12, wherein when an arrangement direction of the first signal electrode, the second signal electrode, and the midpoint electrode is a width direction, the first signal electrode and the second signal electrode include a combination of a first electrode portion and a second electrode portion connected in a direction orthogonal to the width direction, and a width of the first electrode portion is narrower than a width of the second electrode portion.

14. The method according to claim 13, wherein:
the Mach-Zehnder modulator chip includes a plurality of the electrode pairs having different lengths;
the terminator includes the first signal electrode and the second signal electrode provided for each electrode pair; and
in the first signal electrode and the second signal electrode provided for each electrode pair, as a length of the electrode pair connected to the first signal electrode and the second signal electrode becomes longer, a number of combinations of the first electrode portion and the second electrode portion increases.

15. The method according to claim 13, wherein a center position of the first electrode portion in the width direction is closer to the midpoint electrode than a center position of the second electrode portion in the width direction.

16. The method according to claim 15, wherein:
the Mach-Zehnder modulator chip includes a plurality of the electrode pairs having different lengths;
the terminator includes the first signal electrode and the second signal electrode provided for each electrode pair; and
in the first signal electrode and the second signal electrode provided for each electrode pair, as a length of the electrode pair connected to the first signal electrode and the second signal electrode becomes longer, a number of combinations of the first electrode portion and the second electrode portion increases.

17. The method according to claim 16, further comprising structuring the first signal electrode and the second signal electrode such that a shape of each electrode is adjustable.

18. The method according to claim 12, further comprising structuring the first signal electrode and the second signal electrode such that a shape of each electrode is adjustable.

19. The method according to claim 12, wherein:
the first signal electrode is connected to the first electrode of the electrode pair by a first wire; and
the second signal electrode is connected to the second electrode of the electrode pair by a second wire.

20. The optical modulator module according to claim 1, wherein the terminator is electrically connected to the second end portion of the electrode pair by wires.

* * * * *